3,784,715
CHOCOLATE FLAVORED LIQUID CONFECTIONS AND METHODS OF MAKING THE SAME
Sidney Arden, Forest Hills, N.Y., assignor to Consolidated Foods Corporation, doing business as Popsicle Industries, Englewood, N.J.
No Drawing. Filed Oct. 4, 1972, Ser. No. 295,058
Int. Cl. A23g 1/00
U.S. Cl. 426—172                                              11 Claims

ABSTRACT OF THE DISCLOSURE

Chocolate flavored liquid confections in which the cocoa or chocolate particles are uniformly suspended and which possess excellent storage properties may be produced by combining a solution of about 1 to 5 weight percent cocoa or equivalent in chocolate liquor or bittersweet chocolate, about 15–25 weight percent of a sweetener, about 0.05 to 0.75 weight percent xanthan gun, about 0.05 to 0.20 weight percent preservatives, with added food acid, optional salt and artificial flavoring and sufficient water to achieve a solution solids content of 15–30 weight percent solids. The food acid is added in sufficient quantity to maintain a solution pH of about 4.7 to 5.6. The solution mixture is heated to about 180° F. for 30 minutes then cooled to 40–45° F. and filled in plastic film paks.

BACKGROUND OF THE INVENTION

The present invention relates to chocolate flavored liquid confections and methods of making and using the same. More particularly, the present invention is directed to a chocolate flavored water base mix packaged in liquid form which can be stored at room temperature and subsequently frozen to a fudgy composition before eating.

Up to the present time, many different flavors of liquid confections have been manufactured and packaged in plastic paks such as polyethylene, cellophane and other similar type films. These comprise the flavoring, sugars (such as cane and corn sugars), acid, vegetable gum stabilizer and preservatives such as sodium benzoate and potassium sorbate or sorbic acid. The finished confection is adjusted to a pH of 2.7–3.5 by the addition of acid so that the preservative effect will be at a maximum.

Production of chocolate flavored liquid confections cannot be accomplished in this manner since the addition of acid sufficient to reduce the pH to 2.7–3.5 will be detrimental to the chocolate flavor. Also, the type of stabilization used in the prior art is such that the cocoa or chocolate particles are no longer uniformly suspended in the liquid. Liquid chocolate confections made previously in the trade have either spoiled due to the low acid level, or the solids have separated on storage.

Accordingly, it is an object of the present invention to provide an improved chocolate flavored liquid confection.

It is a further object of the present invention to provide a chocolate flavored liquid confection in which the cocoa or chocolate particles are uniformly suspended.

It is still a further object of the present invention to provide a chocolate flavored liquid confection with excellent storage properties.

It is another object of the present invention to provide an improved process for producing chocolate flavored liquid confections.

Other objects will appear hereinafter.

BRIEF SUMMARY OF THE INVENTION

The above and other objects are achieved by the composition of the present invention which comprises a solution containing from about 1 to 5 weight percent cocoa or equivalent in chocolate liquor, from about 15 to 25 weight percent of a sweetener, from about 0.05 to 0.75 weight percent of xanthan gum, from about 0.05 to 0.20 weight percent preservatives, with added food acid, optional salt and artificial flavoring and sufficient water to achieve a solution solids content of 15–30 weight percent solids. The food acid is added in sufficient quantity to maintain a solution pH of about 4.7 to 5.6.

The present invention also includes methods of making chocolate flavored liquid confections wherein the cocoa, sweetener, xanthan gum, and food acid are added to water; the resulting mixture is heated to form a solution; preservative is added; the batch is pasteurized; and the pH is adjusted, if necessary, to about 4.7 to 5.6, and preferably about 5.0 to 5.2. The total water is sufficient to yield a solids content of about 15 to 30 weight percent. After cooling, the solution is loaded into plastic paks.

DETAILED DESCRIPTION OF PREFERRED EMBODIMENTS

The cocoa used in the present invention may be either natural process cocoa or Dutch process cocoa. Moreover, bittersweet chocolate or chocolate liquor having equivalent cocoa solids content may be used. Accordingly, wherever the term "cocoa" is used in this specification or the claims, it will be understood to include chocolate materials having the equivalent in cocoa solids, as well as cocoa per se.

Cocoas generally contain from about 8 to 28 weight percent fat. While low fat cocoas having about 8 to 14 weight percent, and preferably 10–12 weight percent, fat are preferred, higher fat cocoas, such as 16 to 22 weight percent may also be used. The cocoa should be present in the compositions of the present invention in amounts of about 1 to 5 weight percent. It will be understood that the compositions may suitably contain a mixture of low fat cocoas, and a particularly preferred chocolate flavored liquid confection will have about 1 to 2 weight percent of natural process cocoa.

Xanthan gum is a high molecular weight linear polysaccharide gum which is derived from *Xanthomonas campestris* by a pure-culture fermentation process and purified by recovery with isopropyl alcohol. Xanthan gum has been approved by the Commissioner of Food and Drugs as a food additive permitted in food for human consumption; see Federal Register, vol. 34, No. 53, Subchapter B, Section 121.1224, March 19, 1969. It is commercially available from the Kelco Company under the trademark "Keltrol."

Xanthan gum serves to suspend and stabilize the cocoa in the compositions of the present invention, and should be present in an amount of about 0.05 to 0.75 weight percent. While it has not been possible in the past to satisfactorily suspend and stabilize cocoa solids in a liquid confection by use of conventional vegetable gums, it has unexpectedly been found that xanthan gum will not only suspend and stabilize the cocoa solution but prevents separation to the extent of shelf lives of 6 months or more.

Suitable sweeteners used in the present invention include, but are not limited to cane sugar, corn sugar, corn syrup, corn syrup solids and mixtures thereof, and should be present in an amount of about 15 to 25 weight percent. Cane sugar in an amount of about 17-20 weight percent is particularly preferred because of its flavor and preservative qualities.

Preservatives, which should be present in an amount of about 0.05 to 0.20 weight percent, used in the present invention include but are not limited to sodium benzoate, sorbic acid, sodium sorbate, potassium sorbate and mixtures thereof. The sorbates, preferably in an amount of about 0.10 to 0.20 weight percent, are preferred because of their effectiveness at higher pH levels than sodium benzoate and increased solubility when compared to sorbic acid.

Food acids may be selected from organic types such as citric, tartaric, malic, fumaric and lactic acid or an inorganic type such as phosphoric acid. Organic acids such as citric and fumaric are particularly preferred since they have good compatability with the cocoa and other added flavors at the pH level range of the present invention, which should be about 4.7 to 5.6, and preferably about 5.0 to 5.2.

The chocolate flavored liquid confections of the present invention may also contain other ingredients, such as seasoning and other flavorings as desired. Seasonings such as salt may be added to taste, and preferably up to about 0.2 weight percent. Other flavorings aside from cocoa or chocolate liquor, such as vanillin, pure vanilla, ethyl vanillin, imitation chocolate flavor and mixtures of the above may also be added to taste.

The amount of water present in the chocolate flavored liquid confections of the present invention may vary somewhat depending on the choice of cocoas or chocolate liquor and the sweetener. However, in order to obtain good suspension properties of the cocoa or chocolate solids and to achieve good flow, preservative and freezing properties, it is necessary that sufficient water be used to yield a total solids content in the solution of about 15.0 to 30.0 weight percent, and preferably 18-22 weight percent based on the total weight of the liquid confection solution. Lower solids contents than the above ranges will result in substantial decreases in stability of the liquid confection, whereas solids contents above these ranges will result in losses of the desirable flow properties and restrict freezing of the finished chocolate flavored liquid confections.

The process of making chocolate flavored liquid confections of the present invention will now be described. The process may be carried out in any suitable kettle of conventional manufacture which is provided with agitation means and heating means, such as a heating jacket.

The water is first added to the kettle and the agitator is started. The sweetener, cocoa or chocholate liquor, xanthan gum and food acid are added. Heating of the kettle and its contents is begun as soon as the addition of sweetener begins. After addition of the above ingredients, the batch temperature is raised to a temperature of about 180°-185° F. The preservative is then added and the composition is brought to volume with the remaining water. The batch is maintained at the 180°-185° F. level for about 30 minutes to insure proper pasteurization and to fully develop the suspension properties of the xanthan gum. After pasteurization the composition is adjusted to the required 4.7 to 5.6 pH range and preferably to pH 5.0-5.2. A small amount of additional food acid or alkaline preservative such as potassium sorbate can be added to adjust the pH if necessary. The mixture is then cooled immediately to about 40-45° F. and filled into plastic paks with standard plastic film filling equipment. Finished confections can be stored at room temperature and then frozen prior to use.

The chocolate flavored liquid confections of the present invention and the method of making the same will now be illustrated in more detail with reference to the following specific, non-limiting examples:

EXAMPLE I

A preferred chocolate flavored liquid confection was made with the following ingredients:

| Component: | Wt. percent |
|---|---|
| Natural cocoa (10-12% fat) | 1.50 |
| Xanthan gum | .30 |
| Salt | .04 |
| Vanillin | .02 |
| Cane sugar | 20.00 |
| Citric acid crystals | .08 |
| Potassium sorbate | .15 |
| Water | 77.91 |
| | 100.00 |

Most of the water was added to a pasteurizing vat provided with an agitator and a water heating jacket. The agitator was started and the sugar, cocoa, xanthan gum and citric acid were added. After addition of these ingredients, the heat was turned on and the batch temperature raised to 180° F. The potassium sorbate was then added and the batch was brought to volume with the remaining water. The batch temperature was maintained at 180° F. for 30 minutes to obtain proper pasteurization and to fully develop the properties of the xanthan gum. Analysis of a drawn off sample indicated a total solids weight percent (° Brix) of approximately 23.0 and a pH value of 5.0-5.2. The batch solution was then cooled to 40-45° F. and filled in plastic film paks with standard plastic film filling equipment. The resulting confections showed no spoilage or separation of cocoa particles after 6 months storage at room temperature.

The following examples illustrate additional chocolate flavored liquid confection compositions of the present invention which are prepared by the same process as described in Example I:

EXAMPLE II

| Component: | Wt. percent |
|---|---|
| Natural cocoa (10-12% fat) | 1.40 |
| Xanthan gum | .40 |
| Salt | .04 |
| Vanillin | .02 |
| Cane sugar | 15.00 |
| Corn syrup solids | 5.00 |
| Citric acid crystals | .08 |
| Potassium sorbate | .15 |
| Water | 77.91 |
| | 100.00 |

EXAMPLE III

| Component: | Wt. percent |
|---|---|
| Chocolate liquor | 2.80 |
| Xanthan gum | .30 |
| Salt | .04 |
| Vanillin | .02 |
| Cane sugar | 19.00 |
| Citric acid crystals | .08 |
| Sorbic acid | .10 |
| Water | 77.66 |
| | 100.00 |

EXAMPLE IV

| Component: | Wt. percent |
|---|---|
| Natural process cocoa (10-12% fat) | 1.05 |
| Dutch process cocoa (10-12% fat) | .35 |
| Xanthan gum | .30 |
| Salt | .04 |
| Vanillin | .02 |
| Cane sugar | 20.00 |
| Citric acid crystals | .08 |
| Potassium sorbate | .15 |
| Water | 78.01 |
| | 100.00 |

EXAMPLE V

| Component: | Wt. percent |
|---|---|
| Natural process cocoa (10–12% fat) | 1.500 |
| Xanthan gum | .400 |
| Salt | .040 |
| Vanillin | .010 |
| Ethyl vanillin | .005 |
| Cane sugar | 19.000 |
| Citric acid crystals | .080 |
| Sodium benzoate | .050 |
| Potassium sorbate | .100 |
| Water | 78.815 |
| | 100.000 |

EXAMPLE VI

| Component: | Wt. percent |
|---|---|
| Natural process cocoa (10–12% fat) | 1.40 |
| Xanthan gum | .50 |
| Salt | .04 |
| Vanillin | .01 |
| Cane sugar | 19.00 |
| Malic acid | .06 |
| Potassium sorbate | .15 |
| Water | 78.84 |
| | 100.00 |

It will be understood that the term "solution" as used in the foregoing specification and following claims is not limited to true solutions, but covers suspensions and dispersions, since both cocoa solids and chocolate liquor or bittersweet chocolate include fiber material which is suspended rather than dissolved.

The present invention may be embodied in other specific forms without departing from the spirit or essential attributes thereof and, accordingly, reference should be made to the appended claims, rather than to the foregoing specification as indicating the scope of the invention.

I claim:

1. A chocolate flavored liquid confection composition comprising a solution of about 1 to 5 weight percent cocoa, about 15 to 25 weight percent sweetener, about 0.05 to 0.75 weight percent xanthan gum, about 0.05 to 0.20 weight percent preservatives, sufficient water to achieve a solution solids content of 15–30 weight percent solids, and sufficient food acid to maintain a solution pH of about 4.7 to 5.6.

2. A chocolate flavored liquid confection composition in accordance with claim 1 wherein the solution contains 1–2 percent weight natural process cocoa.

3. A chocolate flavored liquid confection composition in accordance with claim 1 wherein said cocoa comprises a mixture of low fat cocoas.

4. A chocolate flavored liquid confection composition in accordance with claim 1, wherein the cocoa is derived from one or more of the group consisting of cocoa per se, chocolate liquor and bittersweet chocolate.

5. A chocolate flavored liquid confection composition in accordance with claim 1, wherein the solution contains about 17–20 weight percent cane sugar as a sweetener.

6. A chocolate flavored liquid confection composition in accordance with claim 1 wherein the sweetener comprises a mixture of cane and corn sugars.

7. A chocolate flavored liquid confection composition in accordance with claim 1, wherein the solution contains .10–.20 weight percent potassium sorbate as a preservative.

8. A chocolate flavored liquid confection composition in accordance with claim 1, wherein the preservative comprises a mixture of potassium sorbate and sodium benzoate.

9. A method of making a chocolate flavored liquid confection of claim 1 comprising the steps of adding the cocoa sweetener, xanthan gum and food acid to water under agitation, heating the aqueous mixture to form a solution, adding preservative, adjusting the water content to 15 to 30 weight percent solids, if necessary, pasteurizing the solution, adjusting the pH to 4.7 to 5.6 with food acid, if necessary, and cooling the solution.

10. A method of making a chocolate flavored liquid confection in accordance with claim 9 wherein the water content is adjusted to yield a total solids content in the solution of 18–22 weight percent.

11. A method according to claim 9 wherein the solution is cooled to about 40–45° F. and the cooled solution is filled into plastic paks.

References Cited
UNITED STATES PATENTS

| 1,989,758 | 2/1935 | Linn | 99—25 |
| 2,556,792 | 6/1951 | Boyles | 99—25 |
| 3,615,659 | 10/1971 | Weber | 99—26 |

RAYMOND N. JONES, Primary Examiner

U.S. Cl. X.R.
426—366, 410